R. LAWRENCE.
EXTENSION ATTACHMENT FOR AUTOMOBILE PEDALS.
APPLICATION FILED DEC. 28, 1916.
1,242,819. Patented Oct. 9, 1917.
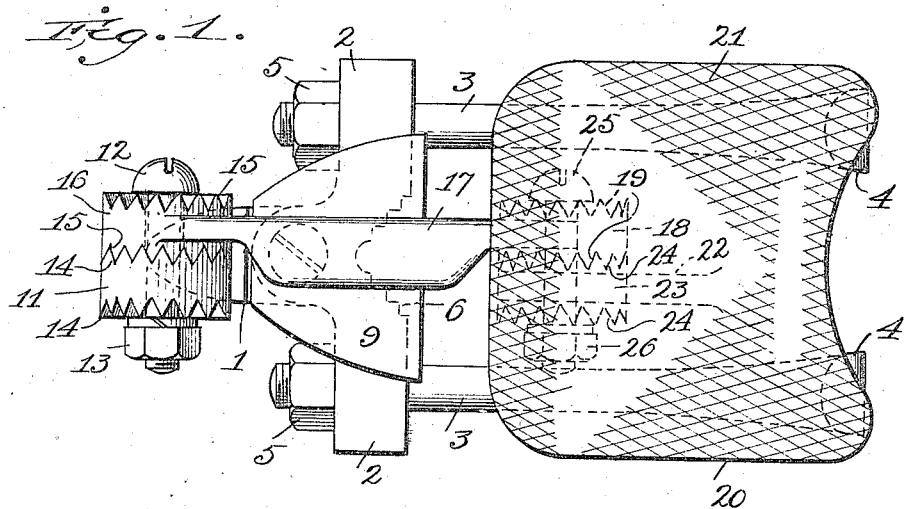
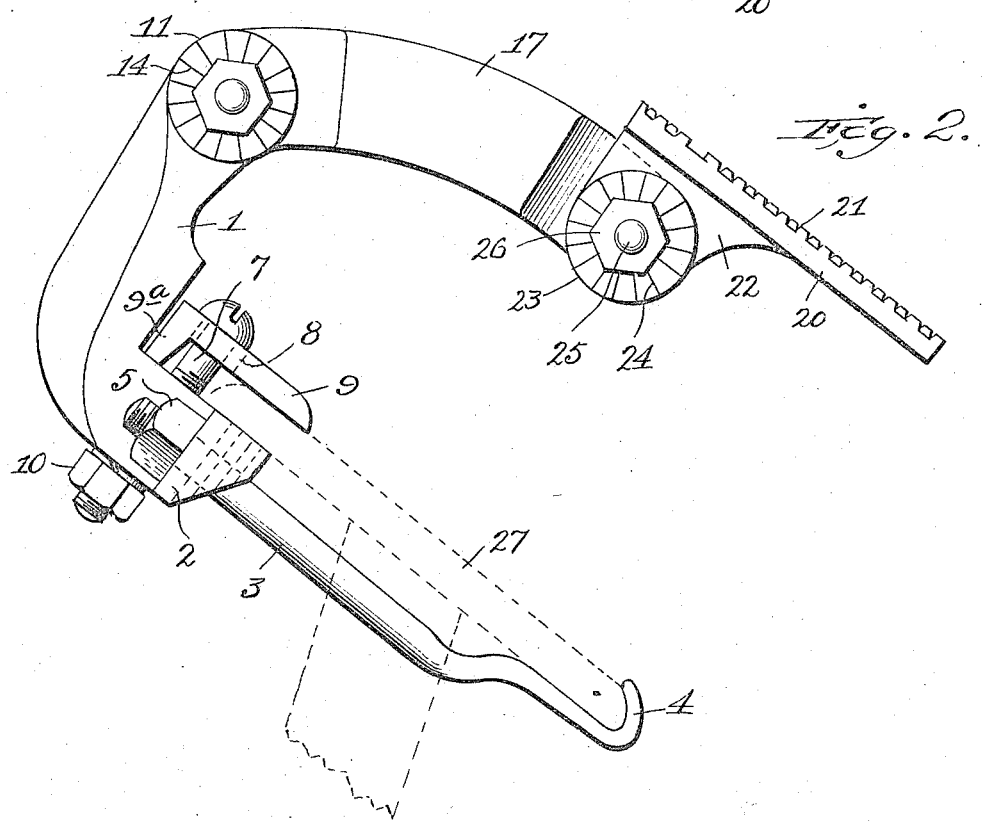
Witness
Edwin L. Jewell
Inventor
Rutherford Lawrence
by Percy B. Hills
Attorney

UNITED STATES PATENT OFFICE.

RUTHERFURD LAWRENCE, OF NEW YORK, N. Y., ASSIGNOR TO SLOCUM, AVRAM & SLOCUM, INC., OF NEW YORK, N. Y., A CORPORATION OF NEW YORK.

EXTENSION ATTACHMENT FOR AUTOMOBILE-PEDALS.

1,242,819.  Specification of Letters Patent.  Patented Oct. 9, 1917.

Application filed December 28, 1916. Serial No. 139,281.

*To all whom it may concern:*

Be it known that I, RUTHERFURD LAWRENCE, a citizen of the United States, residing in the borough of Manhattan, city of New York, and State of New York, have invented certain new and useful Improvements in Extension Attachments for Automobile-Pedals, of which the following is a specification.

My invention relates to extension attachments for automobile pedals, and has for its objects, first, to provide an improved device of this character which is capable of such adjustment as to permit its foot-piece to be adjusted laterally with respect to the automobile pedal to which the device is attached; and, secondly, to provide an improved means of attachment of the device to the automobile pedal.

These objects I accomplish in the manner and by the means hereinafter described and claimed, reference being had to the accompanying drawing, in which:—

Figure 1 is a top plan view of my improved extension attachment.

Fig. 2 is a side elevation of the same, shown in its position when applied to an automobile pedal, the latter being shown in dotted outline.

Similar numerals of reference denote corresponding parts in the two views.

In the said drawing, the reference numeral 1 denotes an angular arm or bracket, formed at its lower end with oppositely disposed ears or lugs 2, apertured to permit the passage therethrough of suitable bolts 3, hooked at 4 at their free ends, and screw-threaded at their inner ends to receive the nuts 5. The body portion of the arm or bracket 1 between said lugs 2 is recessed and stepped at 6, for a purpose hereinafter to be described. Said body portion is also apertured and screw-threaded centrally to receive a suitable screw bolt 7, said bolt passing freely through an elongated slot 8 in an angular clamp 9, and said bolt having threaded onto its lower end a suitable clamping nut 10.

The upper end of the arm or bracket 1 is formed into a hub 11, and is provided with a central screw-threaded aperture through said hub, adapted to receive a screw bolt 12, provided with a clamping nut 13 at one end. Said hub 11 on its opposite sides is formed with radial series of ratchet teeth 14, adapted to be engaged by similar teeth 15 on a hub 16 of a link 17, the screw bolt 12 passing loosely through an aperture in said hub 16, similar to the aperture in the hub 11. The link 17 at its other end is formed into an apertured hub 18, similar to the hub 16, and is provided on opposite sides with radial series of ratchet teeth 19. A foot-piece 20, roughened at 21 on its upper surface to prevent slipping, is provided on its under surface with a lug 22, formed into a hub 23, which is provided with a central screw-threaded aperture, and on its opposite faces is formed with radial series of ratchet teeth 24, similar to the ratchet teeth 19 on the hub 18. A screw-bolt 25 passes through the apertures in said hubs 18 and 23 in screw-threaded engagement with the latter, and is provided with the usual lock-nut 26 at its outer end.

In clamping the device to the ordinary foot pedal 27 of an automobile, shown in dotted lines in Fig. 2, the hooked ends 4 of the bolts are hooked over the edge of the foot-piece of said pedal 27, and the clamp 9 is engaged over the top of said foot-piece, thereby to clamp said foot-piece between it and the underlying top surface of the arm or bracket 1, this clamping action being effected by screwing the bolt 7 downward until the desired pressure is applied to the foot-piece through the clamp 9. By reason of the fact that the bolt 7 passes through the elongated slot or aperture 8 in the clamp 9, the latter is permitted a slight pivotal play upon said bolt, and the engagement of the down-turned arm 9$^a$ of said clamp with the arm or bracket 1 causes said clamp to operate as a lever of the third class, as readily will be understood, thereby permitting a fairly wide range of movement to said clamp in order to accommodate the device to foot-pieces of different thicknesses. Furthermore, the notched recess 6 in the arm or bracket 1 permits the device to accommodate itself to foot pedals formed with a projecting fin, which otherwise would prevent the device from being applied to such pedals.

It readily will be seen that the link 17 may be shifted with respect to the arm or bracket 1 so as to bring its hub 16 upon the opposite side of the hub 11 of said arm or bracket 1, thereby shifting the position of the foot-piece 20 with respect to the underlying foot pedal 27, this being accomplished by removing the bolt 12, shifting the hub 15 with respect to the hub 11, and replacing the bolt 12 and its clamp-nut 13. So also the hub 23 of the foot-piece 20 may be shifted with respect to the hub 18 at the other end of the link 17, by removing the bolt 25 for that purpose, which permits a still further lateral shift of the foot-piece 20 with respect to the foot pedal 27. By reason of this construction, my improved device is particularly well adapted for all makes of cars, wherein the room for such an extension attachment varies, and wherein it is necessary that the extension attachment be shifted laterally to one side or the other with respect to the automobile foot pedal.

It also will be understood that my improved extension attachment is adapted both for the clutch and brake pedals of automobiles, as readily will be understood.

Having thus described my invention, what I claim as new and desire to secure by Letters Patent, is:—

1. An extension attachment for automobile pedals, comprising a foot-piece, and means for clamping the same detachably to an automobile foot pedal, said foot-piece being bodily adjustable laterally with respect to said foot pedal.

2. An extension attachment for automobile pedals, comprising a foot-piece, and means for clamping the same detachably to an automobile foot pedal, said foot-piece being adjustable toward and from said foot pedal and also bodily adjustable laterally with respect to said foot pedal.

3. An extension attachment for automobile pedals, comprising a foot-piece, and means for clamping the same detachably to an automobile foot pedal, said foot-piece being adjustable toward and from said foot pedal and also bodily adjustable laterally with respect to said foot pedal through a common means.

4. An extension attachment for automobile pedals, comprising an arm or bracket, means for clamping the same detachably to an automobile pedal, a foot-piece, a link connecting said arm or bracket and said foot-piece, radial series of ratchet teeth upon both sides of the points of connection between said arm or bracket and link, and means for clamping said teeth detachably into engagement with each other with said link disposed upon either side of said arm or bracket.

5. An extension attachment for automobile pedals, comprising an arm or bracket, means for clamping the same detachably to an automobile pedal, a foot-piece, a link connecting said arm or bracket and said foot-piece, radial series of ratchet teeth upon both sides of the points of connection between said arm or bracket and link and between said link and foot-piece, and means for clamping said teeth detachably into engagement with each other with said link disposed upon either side of said arm or bracket and with said foot-piece upon either side of said link.

6. The combination with an automobile pedal, of an extension attachment therefor comprising an arm or bracket, an angled clamp, and a screw bolt for connecting said clamp to said arm or bracket with one arm of said clamp in contact with said arm or bracket, the other arm of said clamp adapted to engage the automobile pedal, said clamp acting, in conjunction with said arm or bracket, as a lever of the third class to clamp said pedal between the same and said arm or bracket.

In testimony whereof, I hereunto set my hand this 26th day of December, 1916.

RUTHERFURD LAWRENCE.

Copies of this patent may be obtained for five cents each, by addressing the "Commissioner of Patents, Washington, D. C."